United States Patent [19]

Ivice

[11] Patent Number: 5,789,886
[45] Date of Patent: Aug. 4, 1998

[54] WIPER MOTOR AND DELAY CONTROL WITH WINDSHIELD WASHER PUMP

[76] Inventor: Seymour Ivice, 541 Leamington, Wilmette, Ill. 60091

[21] Appl. No.: 610,799

[22] Filed: Mar. 7, 1996

Related U.S. Application Data

[63] Continuation of Ser. No. 422,641, Apr. 14, 1995, abandoned, which is a continuation of Ser. No. 1,331, Jan. 7, 1993, abandoned.

[51] Int. Cl.$^6$ .................................................. H02P 1/04
[52] U.S. Cl. .............................. 318/444; 318/DIG. 2; 15/250.02
[58] Field of Search .................. 318/DIG. 2, 280–300, 318/443–444, 445–447, 461–487; 15/250.1, 250.01, 250.02

[56] References Cited

U.S. PATENT DOCUMENTS

| | | | |
|---|---|---|---|
| 2,189,356 | 2/1940 | Briggs | 103/134 |
| 2,616,374 | 11/1952 | Carson | 103/117 |
| 2,648,287 | 8/1953 | Thoren et al. | 103/117 |
| 2,974,767 | 3/1961 | Fulton | 192/12 |
| 3,041,979 | 7/1962 | McClean et al. | 103/117 |
| 3,074,350 | 1/1963 | Hanna | 103/117 |
| 3,202,103 | 8/1965 | Sully | 103/117 |
| 3,218,983 | 11/1965 | Parrett | 103/117 |
| 3,240,154 | 3/1966 | Robbins | 103/117 |
| 3,303,791 | 2/1967 | Doble | 103/117 |
| 3,351,836 | 11/1967 | Kearns | 316/443 |
| 3,483,459 | 12/1969 | Kearns | 318/310 |
| 3,500,159 | 3/1970 | Kearns | 318/247 |
| 3,529,227 | 9/1970 | Kearns | 318/443 |
| 3,564,374 | 2/1971 | Kearns | 318/443 |
| 3,573,584 | 4/1971 | Kearns | 318/331 |
| 3,581,178 | 5/1971 | Kearns | 318/443 |
| 3,582,732 | 6/1971 | Kovalsky | 318/DIG. 2 |
| 3,582,747 | 6/1971 | Kearns | 318/379 |
| 3,593,090 | 7/1971 | Kearns | 318/444 |
| 3,602,790 | 8/1971 | Kearns | 318/443 |
| 3,728,603 | 4/1973 | Kearns | 318/443 |
| 3,737,750 | 6/1973 | Kearns | 318/443 |
| 3,796,936 | 3/1974 | Kearns | 318/443 |
| 3,829,248 | 8/1974 | Bright et al. | 417/410 |
| 3,849,711 | 11/1974 | Elliott et al. | 318/443 |
| 3,869,654 | 3/1975 | Bischoff et al. | 318/443 |
| 3,876,919 | 4/1975 | Kearns | 318/331 |
| 3,902,106 | 8/1975 | Kearns | 318/443 |
| 4,107,588 | 8/1978 | Seiler | 318/DIG. 2 |
| 4,158,159 | 6/1979 | Orris et al. | 318/443 |
| 4,181,472 | 1/1980 | Sharp | 417/363 |
| 4,339,698 | 7/1982 | Kearns | 318/444 |
| 4,388,574 | 6/1983 | Bois et al. | 318/443 |
| 4,393,341 | 7/1983 | Byrne | 318/443 |
| 4,492,904 | 1/1985 | Graham | 318/444 |
| 4,494,059 | 1/1985 | Kearns | 318/443 |

(List continued on next page.)

OTHER PUBLICATIONS

Anco Installation Instructions for Washer Pump Model 61–16, dated Feb. 1989, The Anderson Company, Michigan City, Indiana.

*Primary Examiner*—David S. Martin
*Attorney, Agent, or Firm*—Fitch, Even, Tabin & Flannery

[57] ABSTRACT

A wiper motor and window washer control system for controlling the wiper motor and window washer pump of a window cleaning system. The wiper motor and window washer control system includes an electronic circuit for controlling the application of window washing fluid by the window washer pump and for controlling the operation of window wipers driven by the wiper motor. The electronic circuit relies on a power metal-oxide semiconductor field effect transistor (MOSFET) for controlling the current applied to the window washer pump. A wash circuit controls the duration of the application of wash fluid according to an R-C network. A wiper control circuit controls the window wipers during the application of the window washer fluid and during operation of the window wipers during normal and intermittent operation. A wiper/wash circuit generates a signal used by the wiper control circuit during application of the window washer fluid.

6 Claims, 2 Drawing Sheets

U.S. PATENT DOCUMENTS

| | | | |
|---|---|---|---|
| 4,544,870 | 10/1985 | Kearns et al. | 318/444 |
| 4,547,716 | 10/1985 | Johnson et al. | 318/444 X |
| 4,663,575 | 5/1987 | Juzswik et al. | 318/444 |
| 4,689,535 | 8/1987 | Tsunoda et al. | 318/443 |
| 4,689,536 | 8/1987 | Iyoda | 318/483 |
| 4,705,998 | 11/1987 | Millerd et al. | 318/444 |
| 4,851,785 | 7/1989 | Gehrt et al. | 329/111 |
| 4,866,357 | 9/1989 | Miller et al. | 318/443 |
| 4,916,373 | 4/1990 | Al-Attar et al. | 318/443 |
| 4,929,876 | 5/1990 | Kato | 318/444 |
| 4,942,349 | 7/1990 | Millerd et al. | 318/483 |
| 4,947,092 | 8/1990 | Nabha et al. | 318/444 |
| 5,049,794 | 9/1991 | Okada et al. | 318/DIG. 2 |
| 5,059,877 | 10/1991 | Teder | 318/444 |
| 5,073,722 | 12/1991 | Tohge et al. | 318/DIG. 2 |

WIPER MOTOR AND DELAY CONTROL WITH WINDSHIELD WASHER PUMP

This application is a continuation, of application Ser. No. 08/422,641 filed Apr. 14, 1995, which is a continuation of Ser. No. 08/001,331, filed Jan. 7, 1993 now both abandoned.

FIELD OF THE INVENTION

This invention relates to a windshield cleaning system. In particular, the invention relates to a windshield wiper motor and windshield washer pump control system for applying washing fluid to the windshield of a vehicle and for wiping away the washing fluid and any rain, snow, dirt, or debris. The invention is an improved windshield cleaning system comprising an active solid state device for controlling the windshield washer pump.

BACKGROUND OF THE INVENTION

Originally, windshield cleaning systems included only windshield wipers for cleaning away rain, snow or other unwanted material from the surface of a vehicle's windshield. In early versions, the speed of wipers was not separately controllable by the vehicle operator, but was totally dependant upon the speed of the vehicle's engine. Subsequently, the speed of the wipers became separately controllable and included the addition of two or more windshield wiper speeds. Later additions to windshield cleaning systems included a means to apply a windshield washer fluid to the surface of the windshield for cleaning the windshield of substances impeding the view of a vehicle operator.

Present day windshield cleaning systems include a variety of features which accommodate the continuously changing environmental conditions affecting the surface of the windshield, windows, or even headlamps. Rain, dirt, mud, snow, dust, and other elements collect on the surface of the windshield and impair the operator's view of the road. To clean the affected windshield, the windshield cleaning system is turned on to apply the windshield washing fluid for a predetermined period of time. At the same time and for a predetermined period of time after the completion of the washer fluid application, the wiper blades operate to clean and remove the unwanted material and washer fluid. In addition to this feature, the operator can adjust the wiper blades to operate intermittently during the presence of a light rain or in the presence of splash and spray from other vehicles on the road. The intermittency of the wiper can be continuously adjusted by adjusting the dwell period of the wiper motor between successive wipes of the blade.

Other types of systems typically have an electronically controlled wiper motor and wiper delay and a mechanically controlled washer pump. The mechanically controlled washer pump is activated on and off for a given period of time by a circuit board containing electronics for the wiper motor and a mechanical control for the washer pump. An electromechanical relay is included to activate the wiper motor. The operation of the mechanically controlled washer pump depends upon the operation of the wiper motor and is therefore a "slave unit" which increases the current demand on the wiper motor thereby shortening the life thereof. In addition, because three separate units are used (the washer pump, the relay, and the circuit board), the repair and replacement of defective components in such a system requires extensive checking of each of the individual units. In the case of a defective pump, for instance, the repair requires a transferral of the electronics and the relay from the defective pump to the new pump. This repair is a complex operation which if not performed properly can damage components and increase repair costs.

SUMMARY OF THE INVENTION

The present invention is a windshield cleaning system comprising a wiper motor and windshield washer pump control system for applying washing fluid to the windshield of a vehicle and for removing the washing fluid and any dirt, debris, rain, snow or other unwanted material. The invention includes an active solid state device for controlling the windshield wash pump using a plurality of circuits to produce timing signals which control the action of the wiper motor and the action of the windshield washer pump. A controlling waveform is generated to drive a power semiconductor device which functions as a control switch for the windshield washer pump, thereby replacing the conventional mechanically controlled washer pump seen in prior art systems.

The present invention is a single unit replacement for currently used windshield wiper systems. As previously mentioned, an electro-mechanical relay is used in prior art systems to activate the wiper motor and the wiper motor in turn mechanically controls the washer pump. Such a system typically, includes the washer pump, the relay, and a circuit board containing both the electronics for the wiper motor and a mechanical control for the washer pump. In contrast, the present invention is a totally electronic washer pump, wiper motor control, and wiper delay control which replaces this prior system and in particular, eliminates the use of a mechanically controlled washer pump.

The wiper motor and delay control with windshield washer pump includes four independent timing circuits which control the on-time of the window wash fluid pump, the on-time of the wiper motor, and the intermittency of the wiper motor. A first circuit controls the amount of time the wash fluid pump dispenses fluid in response to a wash fluid pump actuating switch. A second circuit controls the amount of time the wiper motor operates during and after the activation of the wash fluid pump. A third circuit controls the on-time of the wiper motor and a fourth circuit controls the off-time of the wiper motor.

A wiper motor timing circuit generates at least two types of output voltage waveforms for controlling the wiper motor upon actuation of a wash fluid pump actuation switch or upon activation of a wiper motor actuation switch. The first type is an output signal which is continuously high for keeping the wiper blades in constant motion. The second type of output voltage waveform is comprised of a series of spaced energizing pulses each having a duration sufficient to enable the wiper motor for a single wipe cycle, and the energizing pulses are spaced by a certain time duration which is operator controllable. The first portion of the waveform, which in this embodiment is a positive value, controls the on-time of the wiper motor. A second portion of the signal, which in this embodiment is zero, controls the off-time of the wiper motor. Each of the first, second, third and fourth circuits in conjunction with the wiper motor timer circuit controls the duration of the positive portion and zero portion of the output voltage signal.

For instance, in one type of windshield cleaning system, the wiper motor must be turned on for at least 0.9 seconds to cause the wiper blades to leave the park position due to the park reset time of the park switch. By adjusting the value of the resistor and capacitor of a third circuit, the energizing pulse can be adjusted to 0.9 seconds so that when the wiper blades are turned on, the wiper motor causes the wiper blades to leave the park position for continuous operation. Likewise, the off-time of the output waveform can be adjusted by changing the values of the resistor and capacitor of a fourth circuit where the resistor comprises an operator adjustable rheostat for changing the off-time or dwell time of the wiper motor thereby causing the wipers to operate intermittently. In addition, the time that the wiper blades operate after the wash pump has delivered the wash fluid can be precisely controlled.

The wiper motor and delay control with windshield washer pump provides not only ease of installation, but also provides precise control of the on-time and off-time of the wiper motor and windshield wash fluid pump. The ability to adjust the on-time and off-time provides an apparatus which can be used in a variety of different systems requiring different on-time and off-times of the wiper motor and the wash fluid pump. Thus, the present invention not only decreases repair time, but also improves the compatibility of the apparatus to many types of windshield cleaning systems.

DETAILED DESCRIPTION OF THE PREFERRED EMBODIMENTS

Figure 1:
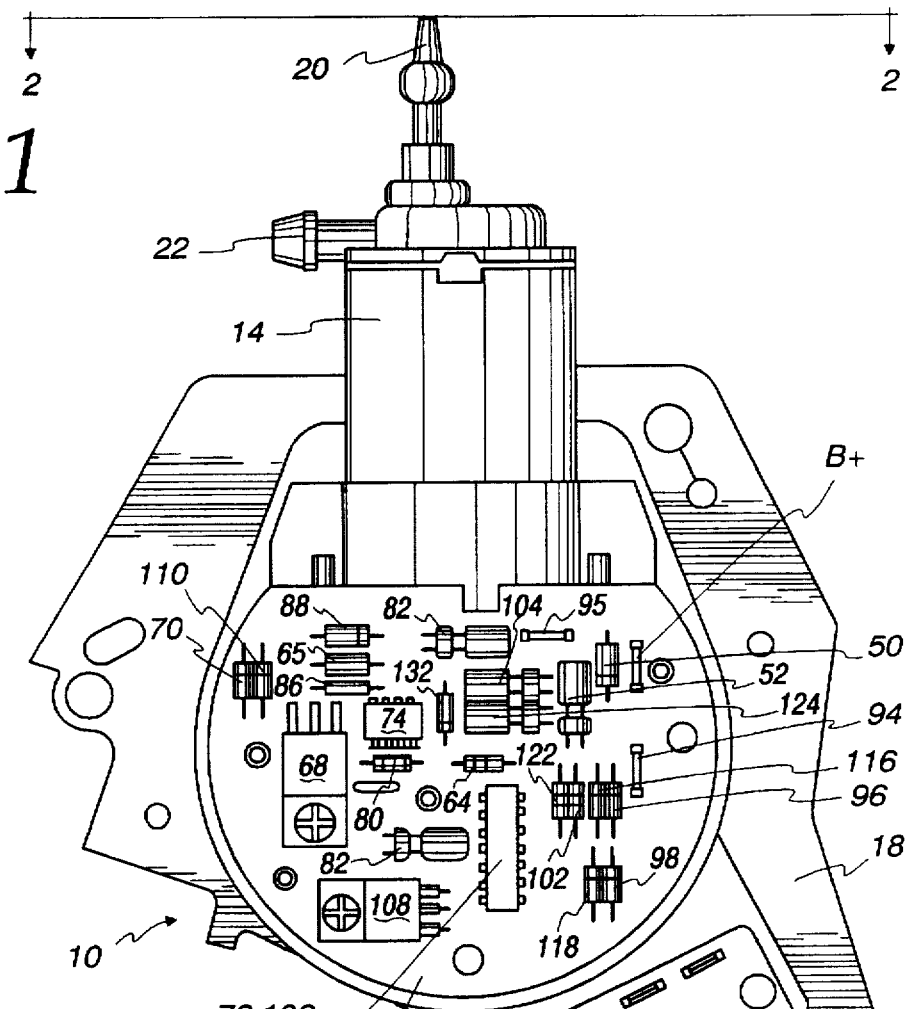
FIG. 1 illustrates a top view of a wiper motor and delay control with windshield washer pump of the present invention.

FIG. 1 is a top view of a combined wiper motor, delay control and windshield washer pump apparatus 10 of the present invention. The apparatus 10 of FIG. 1 typically includes a housing or pump cover to protect the apparatus but the housing is not shown to better illustrate the present invention. The wiper motor and delay control with windshield washer pump 10 is a singular unit designed to replace items used to control the windshield wipers and washing fluid apparatus in a number of automobile types. The apparatus 10 replaces a washer pump and a circuit board containing both the electronics for controlling a wiper motor and a mechanical control for controlling the washer pump.

The apparatus 10 includes an electronic circuit board 12, an electric washer fluid pump 14, a connector 16, and a base 18 for supporting the electronic circuit board 12 and the electric pump 14. The electronic circuit board 12 includes a number of electrical components whose identity and function is described in detail with respect to electronic circuit 32 of FIG. 3 and whose element numbers in FIG. 1 correspond to the later described electronic circuit. The electric pump 14 includes an input nozzle 20 and an output nozzle 22. The connector 16 is used to supply power from the automobile battery, to establish ground potential to the apparatus 10 and to receive and send other signals through a wire harness (not shown) coupled to the connector 16 as known by those skilled in the art.

Figure 2:
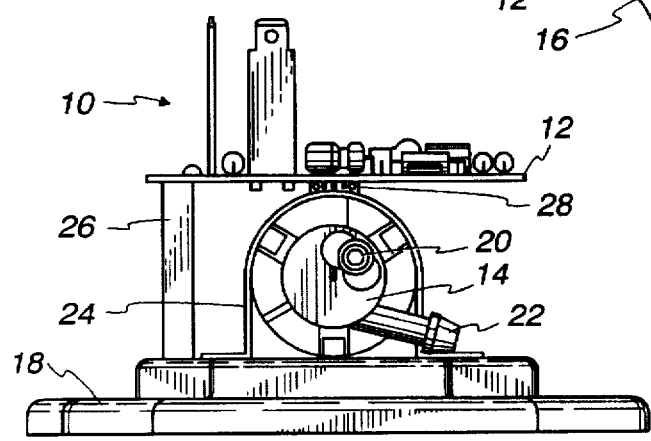
FIG. 2 illustrates a side view of the wiper motor and delay control with windshield washer pump as illustrated in FIG. 1 along a line 2—2.

FIG. 2 illustrates the apparatus 10 of FIG. 1 along a line 2—2. As shown, the washer fluid pump 14 is located between the base 18 and the electronic circuit board 12. The pump 14 is held in place by a bracket 24. The electronic circuit board 12 is positioned above the pump 14 and supported by a support 26. The support 26 can be either formed as one piece structure with the base 18 or can be a part which snap-fits onto the base 18 as would be understood by those skilled in the art. The circuit board 12 is also supported by the pump 14. A piece of double-sided foam tape 28 is placed between the anticipated point of contact of the circuit board 12 and the top surface 30 of the pump 14. The foam tape 28 provides not only the means to hold the circuit board stationary with respect to the base 18 but also provides a means for shock mounting the circuit board 12 from vibration and shock due to engine vibration and road conditions.

Figure 3:
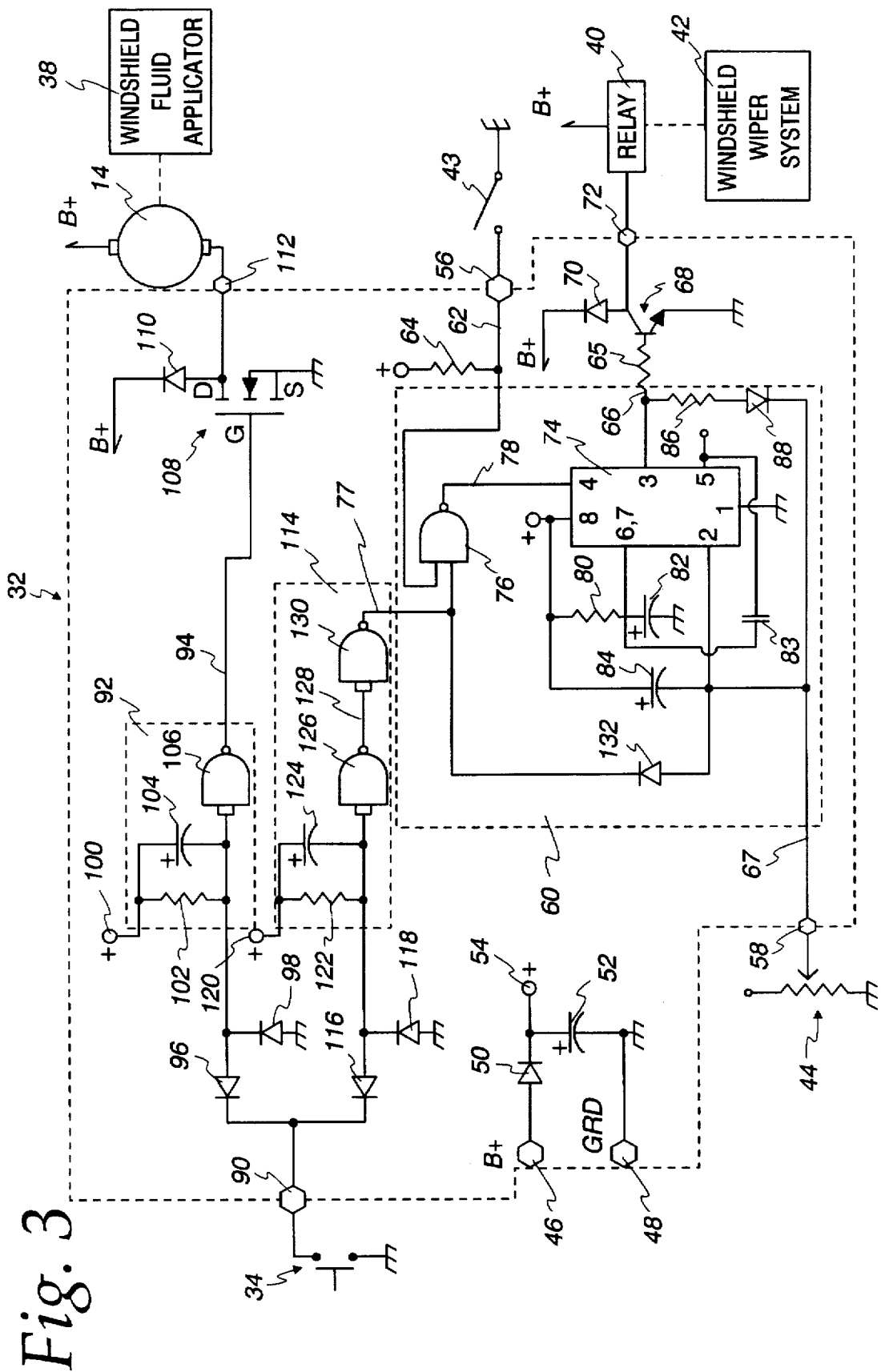
FIG. 3 illustrates a schematic diagram of an electronic circuit of the present invention.

FIG. 3 illustrates a schematic diagram of an electronic circuit 32 of the present invention. The electronic circuit 32 is used to control the windshield wipers of an automobile and to control the application of windshield washer fluid to the windshield. In the present embodiment, the electronic circuit 32 controls the various functions in response to inputs from three different sources, a wash switch 34, a wiper switch 43 and an intermittency control 44. In the embodiment of FIG. 3, the intermittency control 44 is a rheostat.

The electronic circuit 32 responds to a momentary input pulse from the wash switch 34 to begin a washing sequence. The wash switch 34 is located, for example, at the instrument console panel of an automobile and responds to the touch of a driver when the driver wishes to wash the windshield. In the wash sequence mode of operation, washing fluid is pumped by the windshield wash fluid pump 14 for a predetermined period of time. The pumped fluid is applied to the windshield by a windshield fluid applicator 38. The press of wash switch 34 also energizes a relay 40 connected to a park switch of a windshield wiper system 42, as is understood by those skilled in the art, for a predetermined period of time which is longer than the fluid pumping time so that undesired debris and the washing fluid is removed.

Closing the wiper switch 43 completes a circuit through the relay 40 for as long as switch 43 remains closed. If the wash sequence is active when wiper switch 43 is closed the wash sequence will continue and when completed, the wipers will continue to wipe if the wiper switch 43 remains closed.

The electronic circuit 32 also includes an intermittent wiper system. In the present embodiment, the rheostat 44 is adjusted from zero ohms to 1.4 Megohms to adjust the cycle of the intermittence from 1 to 17 seconds. These values can change depending on the system and the wishes of the designer. The cycle is controlled by adjusting the off-time or dwell time for the windshield wiper motor as understood by one skilled in the art.

The wash, wipe and intermittent wiper functions are controlled by the electronic circuit 32. The circuit 32 operates from a source of power generated by the automobile battery. The automobile battery, here designated as B+, is connected to a point 46 and automobile ground is connected to a point 48. The power supply for the electronic circuit 32, designated as a +, is developed from B+ through a diode 50 coupled to the point 46 at its anode. The cathode of the diode 50 is coupled to a capacitor 52 having the negative side thereof coupled to the ground at point 48. The supply voltage, +, is obtained at a point 54.

The wiper switch 43 is coupled to a point 56 of the electronic circuit 32, for initiating continuous or intermittent motion of the wiper blades. The rheostat 44, which is coupled to a point 58, is adjusted to set the time between successive single wiper blade operations during intermittent operation. In the continuous mode however, the rheostat 44, is adjusted so that the wiper of the rheostat 44 is at ground potential.

The wiper switch 43 activates the wiper motor through operation of a wiper motor timer circuit 60. The wiper motor timer circuit 60 is connected to the wiper switch 43 though an enable conductor 62. The enable conductor 62 is also connected to the + supply through a resistor 64.

An output conductor 66 of wiper motor timer circuit 60 is coupled through a resistor 65 to the base of an NPN transistor 68. The emitter of the transistor 68 is coupled to ground and the collector of the device is coupled to B+ through a diode 70 having the anode thereof coupled to the collector. In addition, the collector of the transistor 68 is coupled to a point 72. The point 72 is connected to the relay 40. Additionally, one side of the relay 40 is connected to B+.

The wiper motor timer circuit 60 controls the operation of the wiper motor and consequently the wiper blades. The wiper motor timer circuit 60 operates in two modes. In the first mode, the relay 40 is energized continuously by an output signal at the output conductor 66. In the second mode, the timer circuit 60 generates a series of time separated energizing pulses at the output conductor 66. The time separated energizing pulses each have a duration sufficient to turn on the wiper motor for a single wipe cycle. The energizing pulses are time separated by a time duration determined by the motor vehicle operator adjusting the rheostat 44 which is connected to the wiper motor timer circuit 60 by a conductor 67.

The wiper motor timer circuit 60 includes a timer integrated circuit (IC) 74 having an output at an output pin 3 connected to the output conductor 66. The present embodiment uses a commonly known timer IC such as the SA555 integrated circuit by Texas Instruments. Timer circuit 74 includes a reset input pin 4 which is connected via a conductor 78 to output signals from a NAND gate 76. Whenever the signal on conductor 78 is a low level, the output of timer 74 on conductor 66 is a low level regardless of other inputs to the timer. Thus, a low signal on conductor 66 inhibits the energizing of relay 40. When a high level output is applied by NAND gate 76 to input pin 4 of timer 74, the timer is freed to energize relay 40 in one of its two modes. When the wiper switch 43 is closed, the enable conductor 62 is grounded. The output of the NAND gate 76 is consequently high since the output of a two input NAND gate is only low when both inputs are high. The high input signal on conductor 78 to reset pin 4 of timer 74 permits energization of the relay 40. Electronic circuit 32 has two basic modes, called continuous and intermittent, for energizing relay 40. The continuous mode occurs when conductor 67 is grounded at rheostat 44 and the intermittent mode occurs when a resistance is provided by rheostat 44 between conductor 67 and ground.

In the continuous mode conductor 67 is grounded, which grounds a trigger input pin 2 of the timer 74. Grounding pin 2 causes the output of the timer 74 to go high and to remain high. The high output causes the wiper motor to operate continuously.

In an intermittent mode of operation, the output of the timer 74 delivers a series of time separated energizing pulses. The energizing pulses are approximately 0.9 seconds in duration regardless of the time duration between pulses. The period of 0.9 seconds is sufficient to cause the wiper blades to make one pass due to the operation of the park switch and related circuitry contained in the windshield wiper system 42 as would be understood by one skilled in the art. Of course, the time period of 0.9 seconds can be changed according to the requirements of the windshield wiper system 42.

A threshold pin 6 and a discharge pin 7 of timer 74 are tied together and coupled to the + supply through a resistor 80. A capacitor 82 is coupled between the threshold and discharge pins 6 and 7 and ground. The resistor 80 and the capacitor 82 form an R-C circuit which determines the duration, e.g.,.0.9 seconds, of the energizing pulses at the output conductor 66. In addition, a capacitor 83 is connected to pin 5 and to pins 6, 7 of timer 74 for filtering purposes.

A capacitor 84 is coupled between the + supply and a trigger input at pin 2 of the timer 74. The trigger input at pin 2 is also coupled to the conductor 67 which is in turn connected to the wiper of the rheostat 44. One end of a resistor 86 is connected to receive the output of the timer 74 at the output conductor 66. The other end of the resistor 86 is coupled to the anode of a diode 88. The cathode of the diode 88 is connected to the trigger input at pin 2 and correspondingly to the conductor 67.

In the intermittent mode, the wiper switch 43 is closed, the wash switch 34 is open, and the rheostat 44 is set at some point other than at ground. The signal on the conductor 78 goes high in response to the closing of switch 43 and the trigger input at pin 2 is effectively at ground potential due to the charge held by the capacitor 84. When the signal on conductor 78 goes high, the capacitor 82 begins charging via resistor 80. As the capacitor 82 begins to charge, the output of the timer 74 on conductor 66 goes high, energizing relay 40 via device 68. The output on conductor 66 is high for a period of time established by the resistor 80 and the capacitor 82. While conductor 66 is high, the resistor 86 and the diode 88 and the resistance of rheostat 44 help determine the voltage level at the trigger input of pin 2. This causes the voltage at pin 2 to rise while the voltage across the capacitor 84 decreases. Once the voltage at the threshold pin 6 rises sufficiently, the output on conductor 66 goes low to end the motor energizing pulse, thereby preventing the resistor 86 and diode 88 from having any effect upon the voltage of pin 2.

When the conductor 66 goes low, the capacitor 84 begins to charge which causes the voltage at pin 2 to decrease. Once pin 2 decreases to a predetermined level, the cycle begins again when the timer 74 removes the grounding of the discharge pin 7, thereby allowing the capacitor 82 to charge. At this time the output at pin 3 goes high for a period of time according to the values of the resistor 80 and the capacitor 82 as previously described. The intermittent operation continues as long as the wiper switch 43 is closed and the rheostat 44 is adjusted to other than ground. This repetitive charging and discharging of capacitors 82 and 84 in conjunction with the timer 74 creates a series of time separated energizing pulses on conductor 66 which are used to periodically energize relay 40. By adjusting the wiper of the rheostat 44, the R-C time constant of the rheostat 44 and the capacitor 84 can be varied to adjust the intermittency (dwell time) of the wiper blades in the intermittent mode.

The enabling input on conductor 78 is also controlled by the wash switch 34. The wash switch 34 is coupled to a point 90, for initiating the application of wash fluid to the windshield and for initiating corresponding wiping action of the windshield wipers. To initiate application of the wash fluid, a wash circuit 92 develops an output at a conductor 94 in response to the grounding of point 90 via the wash switch 34. The output at the line 94 establishes the period of time for which the wash pump 14 is activated. The wash circuit 92 is coupled to the point 90 through a diode 96 having the cathode thereof coupled to the point 90. The wash circuit 92 is also coupled to ground through a diode 98 having the anode thereof coupled to ground.

The wash circuit 92 is coupled to the positive supply at a point 100. The point 100 is coupled to an R-C circuit comprised of a resistor 102 and a capacitor 104 connected in parallel. The opposite end of the R-C circuit is connected to the anode of the diode 96 and to a two input NAND gate 106 having each of its inputs tied together. In the present embodiment the NAND gates are Schmidt trigger type of devices.

In operation, the wash circuit 92 develops an output at the conductor 94 which is high for a period of time determined by the R-C time constant of the resistor 102 and the capacitor 104. When the wash switch 34 is open, the capacitor 104 is in an uncharged state as the input impedance to the NAND gate 106 is large. Once the switch 34 is closed, the point 90 is taken to ground, and the input to the NAND gate 106 is low causing the output on conductor 94 to go high. The capacitor 104 charges quickly to the + supply at the point 100 since the point 90 has been grounded. Once the switch 34 is released, the capacitor 104 discharges through the resistor 102 and the voltage level at the input to the NAND gate 106 rises according to the time constant of the R-C circuit. When the voltage reaches a predetermined level, the output of NAND gate 106 changes back to a low level.

The output 94 is coupled to the gate of a power MOSFET 108. The drain of the MOSFET 108 is coupled to B+ through a diode 110 having the anode thereof coupled to the drain. In addition, the drain is coupled to a point 112. The point 112 is coupled to the wash fluid pump 14. The pump 14 is also coupled to B+. When the output of the NAND gate 106 goes high, the gate of the MOSFET 108 goes high, thereby turning on the MOSFET 108 and the pump 14. The wash fluid pump 14 will be activated for an amount of time equal to the time that the wash switch 34 is closed plus the time constant of the R-C circuit comprised of resistor 102 and capacitor 104.

A wiper/wash circuit 114 is also activated when the wash switch 34 is closed. The wiper/wash circuit 114 is coupled to the point 90 through a diode 116 having the cathode thereof coupled to the point 90. The cathode of a diode 118 is coupled to the anode of the diode 116 and to the wiper wash circuit 114. The anode of the diode 118 is also coupled to ground potential.

When the wash switch 34 is open, the wiper/wash circuit 114 generates a high voltage level on the conductor 77. When the switch 34 is closed and the point 90 is taken near ground, the wiper/wash circuit 114 generates a low output signal on conductor 77. The wiper/wash circuit 114 is coupled to the + supply at a point 120. The point 120 is coupled to a resistor 122 and a capacitor 124 which are connected in parallel. The resistor 122 and the capacitor 124 are coupled to the cathode of the diode 118 and to a two-input NAND gate 126 having the two inputs tied together. The output of the NAND gate 126 is connected through a conductor 128 to a two input NAND gate 130 having the two inputs tied together. The output of the NAND gate 128 appears on the conductor 77.

The output signal on the conductor 77 depends on the R-C time constant of the resistor 122 and the capacitor 124 and the NAND gates 126 and 130. The operation of the resistor 122, the capacitor 124 and the NAND gate 126 upon closing of the wash switch is as previously described for the wash circuit 92. The signal at the conductor 128 is, however, inverted by the NAND gate 130. Consequently, whenever the wash switch 34 is closed, the output on the conductor 77 goes low. Otherwise, the output on the conductor 77 is high.

The output on the conductor 77 is low for a period of time equal to the time the wash switch 34 is closed plus the time period of the R-C time constant of the resistor 122 and capacitor 124. In the present embodiment, the R-C time constant of the resistor 122 and the capacitor 124 is set to be approximately twice the R-C time constant of the resistor 102 and capacitor 104 of the wash circuit 92. These time constants can of course be adjusted by selecting other values of resistance and capacitance. In the present embodiment, the wiper blades will operate for approximately twice as long as the application of the wash fluid upon activation of the wash switch 34 to the windshield.

The wiper motor timer circuit 60 receives the output of the wiper/wash circuit 114 on the conductor 77. The conductor 77 is coupled to one input of the NAND gate 76. The conductor 77 is also connected to the trigger input pin 2 of the timer 74 through a diode 132. The cathode of the diode 132 is connected to the conductor 77. Closing wash switch 34 causes a low level signal to be applied to conductor 77 which forms one input to NAND gate 76. The low level input to NAND gate 76 causes a high level signal on conductor 78 which frees the timer circuit 74 to control the wiper motor.

When the conductor 77 is low, the trigger input pin 2 of the timer 74 is held low by diode 132. Since the signal on conductor 78 is high and the trigger input pin 2 is low, the output of the timer 74 at the conductor 66 is high which turns on the wiper motor. As can be seen from this arrangement, whenever the conductor 77 goes low, the wiper motor is set in continuous motion no matter what state it is currently operating in. For instance, if the wipers are operating in the intermittent mode, the low on the conductor 77 will cause the wiper motor to operate continuously until the R-C circuit comprised of the resistor 122 and the capacitor 124 has timed out since the trigger input pin 2 will be held low by diode 132. The wiper motor will also operate continuously for a period of time set by the R-C circuit of the wiper/wash circuit 114 when the wiper switch 43 is open and the wash switch 34 is depressed.

Thus there has been described herein a wiper motor and delay control with windshield washer pump for use in removing dirt, rain, snow or other undesired material from the windshield or windows of a moving vehicle or from any window or light source to improve the transmission of light therethrough. The present invention includes an active solid state device for operating a windshield fluid pump offering simplicity of replacement and low cost. The foregoing description of the invention has been presented for purposes of illustration and description. It is not intended to limit the invention to the precise forms disclosed, and many modifications and variations are possible in light of the above teachings.

What is claimed is:

1. A single board electronic control circuit for controlling a wiper motor and a washer pump in response to a wiper switch and a washer switch, said control circuit comprising:

an operator adjustable intermittence controller having a first position and at least one second position;

a wiper timer circuit for substantially continuously energizing the wiper motor when enabled and the intermittence controller is in the first position and for intermittently energizing the wiper motor when enabled and the intermittence controller is in a second position, said wiper timer circuit comprising an integrated circuit having a trigger input, the integrated circuit, upon enablement, for energizing the wiper motor when the voltage at the trigger input is less than a predetermined voltage and for not energizing the wiper motor when the voltage at the trigger input is equal to or greater than the predetermined voltage;

a wiper control circuit responsive to the wiper switch for enabling the wiper timer to energize the wiper motor in accordance with the position of the intermittence controller;

a washer control circuit responsive to the washer switch for enabling the washer pump;

the intermittence controller comprises means for alternatingly applying to the trigger input, voltages above and below the predetermined voltage when the intermittence controller is in the second position; and apparatus responsive to the washer switch for enabling the wiper timer to substantially continuously energize the wiper motor and for inhibiting the intermittent energizing of the wiper motor by the wiper timer circuit when the intermittence controller is in the second position, said apparatus for inhibiting the intermittent energizing of the wiper motor comprising means for substantially continuously holding the trigger input to a voltage less than the predetermined voltage.

2. A single board electronic control circuit in accordance with claim 1 wherein the wiper timer includes a feedback arrangement responsive to the position of the intermittence controller for controlling an intermittence rate at which the wiper timer energizes the wiper motor and the apparatus responsive to the washer switch for enabling the wiper timer comprises means for inhibiting the operation of the feedback arrangement so that the wiper timer circuit substantially continuously energizes the wiper motor regardless of the position of the intermittence controller.

3. A single board electronic control circuit in accordance with claim 2 wherein the washer control circuit comprises a second timer for enabling the washer pump for a first predetermined period of time.

4. A single board electronic control circuit in accordance with claim 3 wherein the washer control circuit comprises a third timer for enabling the wiper timer for a second predetermined period of time after the operator controls the washer switch, the second predetermined period of time being greater than the first predetermined period of time.

5. A single board electronic control circuit in accordance with claim 4 comprising a semiconductor driver on the single circuit board for substantially directly energizing the washer pump.

6. A single board electronic control circuit in accordance with claim 5 wherein the semiconductor driver is a metal oxide semiconductor field effect transistor.

* * * * *